United States Patent Office 3,510,067
Patented May 5, 1970

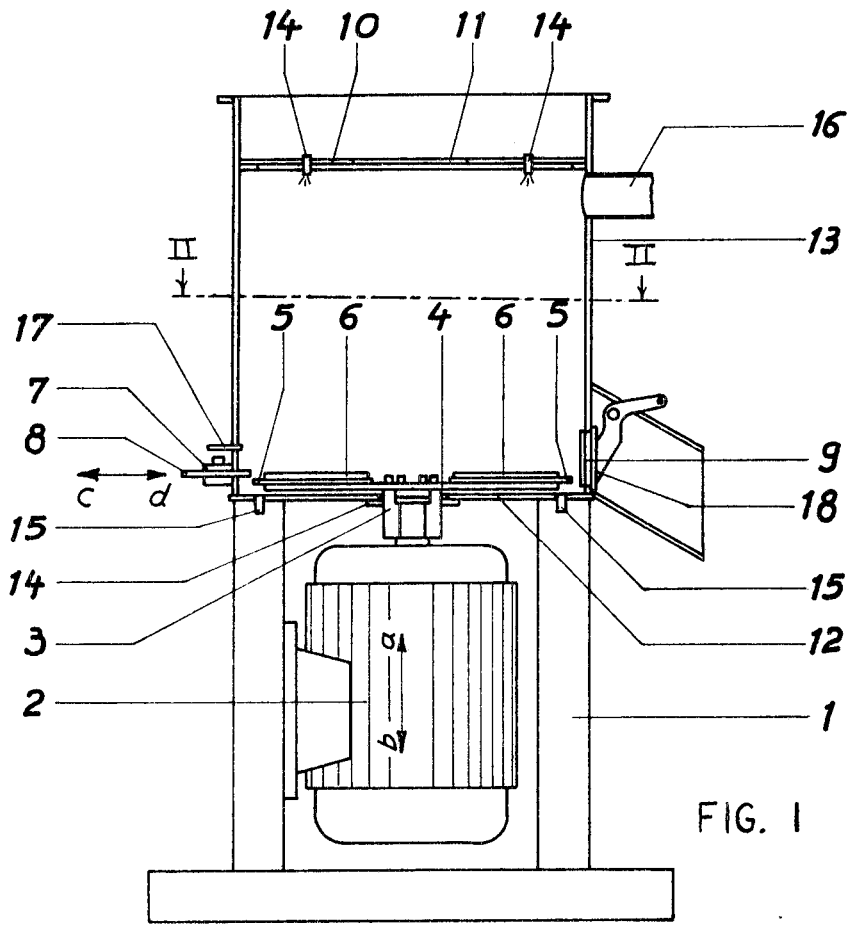
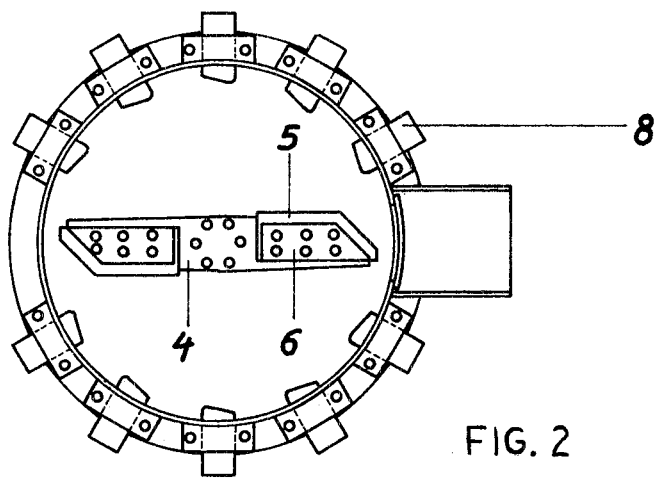

---

3,510,067
METHOD AND DEVICE FOR CONVERTING THERMOPLASTIC FOIL WASTE TO A FLOWABLE GRANULAR MATERIAL
Erich Beck, Worms-Weinsheim, and Heinrich Schulz, Hanau, Germany, assignors to Fellner & Ziegler G.m.b.H., Frankfurt am Main, Germany, a corporation of Germany
Filed Sept. 1, 1967, Ser. No. 665,152
Claims priority, application Germany, Sept. 2, 1966,
F 50,106; Aug. 11, 1967, F 53,207
Int. Cl. B02c 19/00
U.S. Cl. 241—17                     14 Claims

ABSTRACT OF THE DISCLOSURE

Thermoplastic foil waste is converted to re-usable granular material by mechanically beating the waste to thereby comminute it, and then continuing the beating operation for producing frictional heat which causes densification and agglomeration of the particles. The resulting granules are cooled while the beating motion is continued, thus permitting the granular material to be issued without sticking. A correspondingly controllable single beater unit equipped for timed supply of coolant is employed to perform the process in a continuous sequence of operations.

---

This invention relates to the conversion of thermoplastic foil waste, particularly although not exclusively waste from polyethylene foils, to a flowable granular material by comminuting the foil waste into small particles and thereafter densifying and agglomerating the particles to produce granules.

According to known methods and devices of this type, the comminuting process is performed separately from a subsequent densification and agglomeration process. Upon comminution of the foil waste in cutting mills, the densification, as a rule, takes place in rapidly running mixers in which the power supplied to the mixing tools is converted into frictional heat acting upon the charge. In this manner the material is heated to such an extent that it will become densified to the constitution of an agglomerated granular material. This process is followed by a cooling and loosening process in still another apparatus in order to secure a flowable or fluidizable product. This method of separate processing requires voluminous sets of equipment and involves an uneconomical amount of power consumption. It is also disadvantageous that the continuous comminution process must be followed by a batchwise densification and agglomeration process. There also occurs dosage difficulties as to the batch quantities of foil material to be charged into the comminuting machinery.

It has been attempted, therefore, to perform the comminution, densification and agglomeration, as well as a subsequent cooling and loosening by air, in a continuous sequence although in separate devices. Despite its continuity, such a method requires a relatively precise dosage of material to be entered into each of the respective stages, especially the comminuting machinery, but a sufficiently precise dosage control can be performed only with considerable difficulty because foil waste is troublesome to be gripped by distributors and conveyed in accurate dosages. The success of the method, therefore, depends greatly upon the skill of the attending personnel or upon considerable expenditure for an intricate regulating system.

In the processing method just mentioned, the thermoplastic foils are first cut in a conventional cutting mill to foil slivers and then entered into a spur-gear mill or a similar mill operating with two discs rotating against each other for densifying and agglomerating the material between each other by converting mechanical work into heat, whereafter the agglomerated material is cooled in separate equipment. The granules resulting from such processing are greatly different in size and for that reason are subsequently supplied to another cutting mill which reduces them to the desired fine mesh size. Due to the three steps involved, the process requires a considerable amount of equipment, especially due to the fact that the transportation of solids between the individual devices of the plant is effected pneumatically, requiring a number of solid-from-air separators as well as intermediate control equipment.

It is an object of the present invention to devise a method and apparatus for converting thin thermoplastic waste, such as foil waste, thin residue from blowing operations such as resulting from the production of cups, packaging, etc., into a flowable or fluidizable granular material while minimizing or virtually eliminating the above-mentioned disadvantages of the method and devices heretofore known for such purposes.

Another more specific object of the invention is to convert foil waste into granular material by a simple method and with the aid of simple equipment within a single processing operation.

To achieve these objects, and in accordance with the invention, the foil waste is charged batchwise into a container and is worked in the container by beater members until the waste is comminuted and, due to the energy supplied by the same beater members, is also densified and agglomerated, whereafter the agglomerated foil waste is cooled by supplying or adding a coolant while the beater members are kept running.

The coolant reduces the temperature of the agglomerated foil waste at least at the surface to such an extent as to prevent the granules from baking together. Various coolants can be used for this purpose. Particularly well applicable for cooling agglomerated foil waste is the injection of a liquid, preferably water, although other liquids are sometimes also suitable. A gaseous coolant may also be introduced into the processing container during the last stage of the process to effect the desired cooling of the agglomerated foil-waste surfaces. A combined application of liquid coolant and gaseous coolant permits obtaining not only an intensive cooling effect by the liquid but also a rapid drying of the granules supported by the inherent heat of the granules. The cooled granules are preferably discharged from the processing container pneumatically with the aid of the coolant gas.

In some cases the use of a cooling liquid is not appropriate for technological reasons and the exclusive use of cooling gas may be undesirable on account of the large gas volume required. It has been discovered that in such cases the cooling of the agglomerated foil waste can be effected by adding to the charge quantity in the container a properly dimensioned additional quantity of comminuted, preferably thermoplastic synthetic material. The additional material thus supplied for cooling purposes is preferably used in the form of foil silvers or in pulverulent constitution or it consists of already agglomerated and cooled foil waste stemming, for example, from a preceding charge. The amount of plastic thus added for cooling may consist of the same material as the agglomerated waste processed according to the invention, or it may consist of a different material. The addition of the plastic coolant is to be effected at the same time, relative to the operating cycle, at which otherwise a liquid is injected or a cooling gas is supplied. The surfaces of the granules or agglomerated product formed in the preceding method step are covered by the added plastic material so that these surfaces are cooled. This suffices to prevent the granules from sticking together after they have left the processing container. Thus the flowability of the granular mass remains preserved. Used for cooling is preferably a quantity of plastic material amounting to approximately 10% of the charge quantity contained in the processing container. Even if plastic material is added for cooling purposes, a cooling gas may be additionally supplied. In this case, too, the gas may be used for pneumatically entraining the granular mass out of the container and, if desired, to further cool it in the conveyer line connected to the container outlet.

Using plastic material for such cooling does not entail any change of the foil material proper, and the machines used for further processing the granular mass are not subjected to residue of cooling liquid or vapors, without requiring auxiliary expedients or devices for expelling such residual quantities.

Since the foil waste to be granulated is filled batchwise into the container equipped with rotating beater members, the dosage problems occurring with a continuous supply of foil waste to comminuting machines or the like, are obviated. Also applicable, however, is a quasi-continuous operation by having the filling operation, the driving duration of the beater members, the supply of coolant and the discharging of granular mass from the container controlled by a keyer or the like monitoring or programming device. The granular mass issuing from the container may enter into a hopper from which it is continuously conveyed to an extruder or other fabricating machinery. Of course, the granular mass may also be charged directly into the inlet hopper of a machine for further processing.

Especially if the cooling is exclusively by injection of liquid, it is advantageous to inject just as much liquid as will completely evaporate during cooling of the granular mass. Any necessary after-drying can then take place in a subsequent operating pneumatic conveying device or the like. This affords the assurance that no moisture will evaporate and may cause trouble during the further processing of the granules, especially in extrusion presses. When cooling by injected liquid, the cooled granules, as a rule, are discharged from the processing container while the beater members continue running because this promotes emptying the container and prevents undesired agglomeration of the individual grains. During such a continued run the beater members may also effect a subsequent comminution of the granules already formed.

In some cases, especially if the granular mass is to be conveyed pneumatically to the locality of use, it is preferable to have the cooled granules fluidized or pneumatically carried out of the container by cooling gas, preferably air. For this purpose, the gas nozzles of a gas mixing system may be arranged at the bottom of the container, and an outlet may be provided in the top portion of the container. The gas current from the nozzles to the outlet provides for intensive whirling of the agglomerated foil waste and in coaction with the beater members, improves the mixing and cooling of the material since all of the granular mass discharged from the container has been reliably in intensive contact with the air current.

According to another feature of the invention the process of the invention is performed by reducing during the cooling step the energy supplied by the beater members to the agglomerated foil waste. For this purpose a pole-switchable induction motor or other speed-controllable drive motor may be employed for operating the beater members, the motor being switched to a lower speed of rotation during the cooling operation.

Together with the coolant, other substances may be supplied in order to be mixed or chemically react with the agglomerated foil waste. Any such additives may be used in dry, dissolved or emulgated form. Also substances for accelerating the solidification of the agglomerated foil waste may be added in this manner.

Due to the spacial combination of the method steps comminution, densification, agglomeration, cooling loosening and, as the case may be, drying, a device for performing the method according to the invention is much simplier than the equipment heretofore needed. A preferred embodiment of such a device according to the invention comprises a cylindrical upright container provided with an inlet and an outlet. Beater members rotate in the bottom portion of the container about its vertical axis, and fixed blades or the like comminuting members protrude inwardly from the container wall into coactive relation to the beaters. The device further comprises nozzles or openings for supplying the coolant through the container wall or in the outlet of the container. For adapting the comminuting conditions to the particular foil waste to be processed, it is advantageous to design the beater members as arms which are adjustable in the axial direction of the container and are equipped with radially adjustable beater ledges which in the event of wear can be readily exchanged. The fixed commutating members are preferably made adjustable in directions radial and or parallel to the axis of the container.

The invention will be further described with reference to the drawing showing by way of example an embodiment of device according to the invention.

FIG. 1 is a partly sectional side elevation of the device, and

FIG. 2 is a cross-sectional view, the section being taken along the line II—II in FIG. 1.

The illustrated device comprises a cylindrical container 13 having a vertical axis. The container is supported on a frame structure 1 in which a drive motor 2 is mounted so as to be vertically and hence axially adjustable, this being indicated by a double-headed arrow $a$–$b$. A hub 3 on the drive shaft of the motor 2 passes upwardly through a sealing plate 14 and through the bottom 12 of the container into its interior chamber where beater members 4 are fastened to the hub 3. The beater members 4 are constituted by arms to which beater ledges 5 are fastened by clamping plates 6. Fixed comminuting members in the shape of plates, blades or pins 8 are provided along the inner periphery of the container 13 at about the same height as the beater members 4. The plates 8 are radially displaceable in the direction indicated for one of them by a double-headed arrow $c$–$d$ in FIG. 1 and can be fixed in the desired position by means of a clamping plate 7.

The cover 10 of the container has an inlet opening 11 which may be closed by a lid (not illustrated) on which may remain open during operation of the device if the diameter of opening 11 is not so large as to permit foil particles from being flung out of the device during the comminuting and agglomerating operation. An outlet 9 in the cylindrical wall of the container immediately above the container bottom 12 is normally closed by a flap 18.

Mounted on the cover 10 of the container are a number of injection nozzles 14 for the supply of cooling liquid. Corresponding nozzles 15 for injection of a cooling gas are provided in the bottom 12 of the container. An outlet duct 16 in the top portion of the container shortly beneath the cover 10 serves to withdraw vapors during the cooling operation and may be connected to a fan. If a quantity of foil material in the form of slivers or powder is to be added for the purpose of cooling the charge, the solid coolant may be entered through the opening 11 of cover 10 or also through the duct 16. As explained, such an added quantity of solid coolant must be rated in proportion to the quantity of the charge being processed in the container. If desired, of course, separate inlets may be provided for this purpose in the cover or in the container wall 11.

A thermometer 17 permits supervising the agglomerating process and is mounted to protrude into the charge contained in the processing container. Such a thermometer is also suitable as a sensor for automatically controlling the injection of liquid and or the blowing of cooling gas into the container upon termination of the agglomerating stage.

While the beater rotor shown on the drawing is equipped with two arms, it will be understood that it may comprise a larger number of beater arms. Furthermore, the beater arms and the correlated fixed comminuting members 8 may be arranged in several planes axially spaced from each other.

The following example involved the use of a machine as illustrated, having a cylindrical container of 1.1 m. diameter and a height of 1.5 m. The beater arms extended into the immediate vicinity of the fixed comminuting plates as shown. A quantity of 60 kg. polyethylene foil waste was filled into the container. The comminution by tearing of the foil waste between beater arms and plates was effected at a peripheral speed of about 70 m./sec. within approximately 4 minutes. The beater rotor was continued to be driven for an additional period of about 3 minutes during which most of the mechanical power supplied was converted into heat with the result that the foil waste was densified and agglomerated. During such continued running of the beater arms, approximately 1.5 liter water of 20° C. was injected for a short interval of time. After one additional minute the solidified and cooled granular mass was discharged and was found to have no tendency to bake together.

To those skilled in the art it will be obvious from a study of this disclosure that the invention is amenable to various modifications and may be reduced to practice by means of embodiments other than particularly illustrated and described herein, without departing from the essential features of the invention and within the scope of the claims annexed hereto.

We claim:
1. The method of converting thermoplastic foil waste into flowable granular material, which comprises charging the foil waste batchwise into a container and mechanically working them in the container by beating until the foils are comminuted and then densified and agglomerated and thereafter cooling the resulting granular thermoplastic material by supplying a coolant while continuing the beating motion.

2. The method according to claim 1, wherein said cooling of said granular material is effected by injecting a liquid.

3. The method according to claim 2, wherein the quantity of liquid injected corresponds to that evaporating during the cooling of the granular material.

4. The method according to claim 1, wherein said cooling of said granular material is effected by supplying a cooling gas.

5. The method according to claim 1, which comprises passing a cooling gas through said container for effecting said cooling and pneumatically passing the cooled granular material out of said container.

6. The method according to claim 1, wherein said cooling of said granular material is effected by injecting a liquid and blowing a gas into said container.

7. The method according to claim 1, wherein said cooling of said granular material is effected by injecting a liquid and blowing a gas into said container, the quantity of liquid injected being substantially equal to that evaporating during the cooling of the granular material.

8. The method according to claim 1, wherein said cooling of said granular material is effected by injecting a liquid and blowing a gas into said container, and discharging the cooled granular mass pneumatically with the aid of said gas.

9. The method according to claim 1, wherein said cooling of said granular material is effected by adding thereto a comminuted thermoplastic synthetic material in a small quantity as compared with that of said material to be cooled in said container.

10. The method according to claim 9, wherein said synthetic material is added in the form of foil slivers.

11. The method according to claim 9, wherein said synthetic material is added in pulverulent form.

12. The method according to claim 9, wherein said synthetic material is added in the form of agglomerated and cooled foil waste.

13. The method according to claim 9, wherein said quantity is about 10% by weight of the quantity of material to be cooled in said container.

14. The method according to claim 1, which comprises the step of reducing during cooling the power supplied to the waste material by said beating.

References Cited

UNITED STATES PATENTS 2,974,883   3/1961   Engel _____ 241—17

GERALD A. DOST, Primary Examiner

U.S. Cl. X.R.
241—65, 185